Patented Mar. 19, 1940

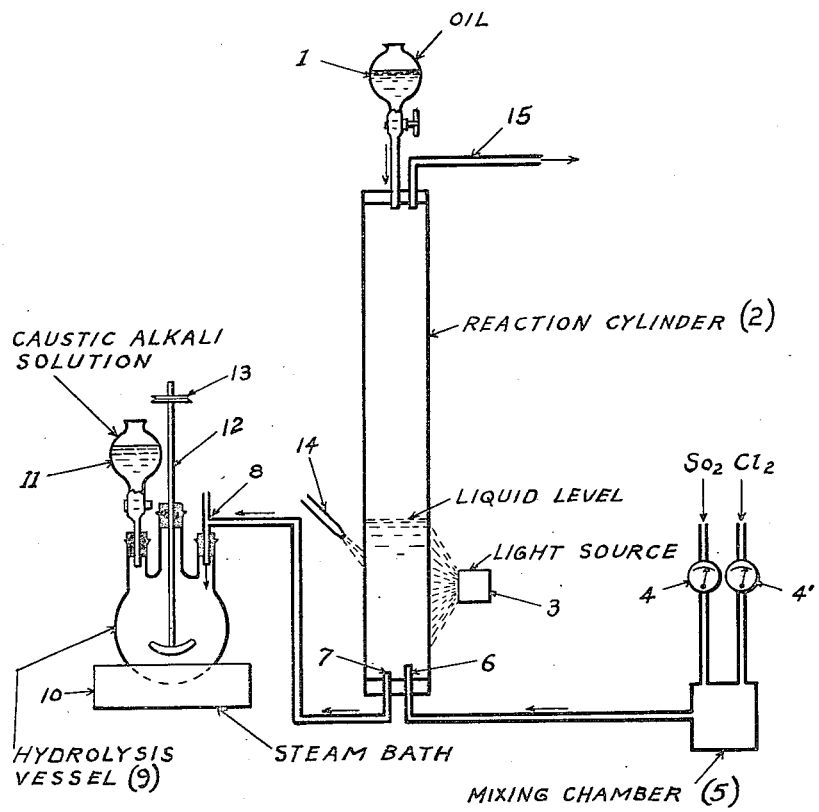

2,193,824

UNITED STATES PATENT OFFICE 2,193,824

COUNTERCURRENT REACTION OF HYDROCARBONS WITH SULPHUR DIOXIDE AND CHLORINE

William H. Lockwood, Wilmington, Del., and Joseph L. Richmond, Woodstown, N. J., assignors to E. I. du Pont de Nemours & Company, Wilmington, Del., a corporation of Delaware Application June 30, 1938, Serial No. 216,843

14 Claims. (Cl. 260—686)

This invention relates to an improved process of preparing organic compounds involving a reaction between a gaseous mixture of sulphur dioxide and chlorine. In a more limited sense it relates to a continuous process for preparing organic compounds involving a continuous reaction between a gaseous mixture of sulphur dioxide and a saturated organic compound, particularly a liquid or easily liquefiable hydrocarbon.

This invention has for an object the manufacture of organic compounds from gaseous chlorine and sulphur dioxide by a simple continuous method. A further object is the preparation of organic compounds from gaseous chlorine and sulphur dioxide in a continuous manner involving a simple reaction step. A still further object is the preparation of surface active organic compounds and intermediates therefor, involving simple and economical reagents. A further object is the preparation of surface active agents involving a reaction between gaseous and liquid reactants in an easily controllable manner capable of producing high yields and in an economical apparatus. Still other objects will appear hereinafter.

The above and other objects are accomplished by passing, for example, a hydrocarbon or mixture of hydrocarbons through a reaction zone while passing in a countercurrent direction a gaseous mixture of sulphur dioxide and chlorine. The reaction vessel is in general vertically disposed and is preferably in the shape of a column of narrow cross-sectional area. The vessel may be made wholly or in part of transparent material, such as glass, and the reaction zone is preferably illuminated by a suitable source of actinic light. The reacted hydrocarbon mass is continuously withdrawn and is then hydrolyzed and neutralized with an alkali or base-acting solution. The resultant product may then be purified by any convenient methods to yield a surface active material whose particular application depends upon the nature of the starting material.

This invention will be exemplified in terms of the following procedural conditions. The hydrocarbon or hydrocarbon mixture in a liquid state which is used as a starting material is caused to flow down through a vessel by gravity where it is contacted by a gaseous mixture of sulphur dioxide and chlorine flowing countercurrent to it. The reaction zone is illuminated by a suitable source of actinic light. The reacted oil then passes out of the vessel and is collected in a reservoir or is continuously hydrolyzed or otherwise treated to recover valuable components therefrom.

The reaction mass may be hydrolyzed by pouring it into strong aqueous alkali solution whereupon an aqueous solution of the sodium salt of a sulphonic and/or chlor sulphonic acid is formed. The aqueous solution may then be diluted whereupon an oil layer will separate to the top and the lower aqueous layer may be withdrawn and dried by any suitable means, such as drum drying for example, and a solid product obtained which is a surface active agent. The neutralized products may be used wherever surface active agents are desired and, depending on the starting material, are useful in the textile industry as a wetting agent, detergent, penetrating agent, mercerizing assistant, rewetting agent, wool scouring agent, etc. They are also useful in the leather industry and other industries where surface active materials are used.

One type of apparatus suitable for carrying out the process is illustrated in the accompanying schematic drawing. Referring to the drawing, a hydrocarbon oil, for example, is contained in a dropping funnel 1 and is introduced into the reaction cylinder 2 which is preferably composed of glass, at least in the area which is illuminated by the source 3 of actinic light. Gaseous sulphur dioxide is passed through a flowmeter 4 and gaseous chlorine through a flow meter 4' to a mixing chamber 5, whereupon they flow through a single pipe or conduit to an orifice 6 and pass upwardly through the cylinder to react with the hydrocarbon oil which is passing down through the tower. The excess or unreacted gases escape through vent 15 and may be recovered and recycled or separated and purified and again passed into the system. The oil accumulates in the reaction cylinder and forms a reaction zone which is illuminated by the source of actinic light. The reaction zone may be cooled by an air blast from jets 14. The reacted oil flows through outlet 7 and passes through discharge orifice 8 into hydrolysis vessel 9. The height of the orifice 8 determines the liquid level in the reaction cylinder. The hydrolysis vessel is maintained at an elevated temperature by means of a steam bath 10. The vessel is provided with a dropping funnel 11 through which a caustic soda solution is introduced to hydrolyze the reaction product which has been removed from the reaction cylinder 2. The hydrolysis vessel is provided with a stirrer 12 which is in turn equipped with a pulley 13 for activating the same.

The invention will be more fully illustrated but is not intended to be limited by the following examples:

Example I

Three hundred grams of a white oil having a specific gravity of 0.8033 and a distillation range of 264-308° C. were charged into the dropping funnel of the apparatus illustrated in the drawing. The reaction zone contained the reacted oil left from an immediately preceding run of the same oil. The flow of sulphur dioxide and chlorine was started and the gases were passed through the reaction zone at the rate of 227 g. of sulphur dioxide and 73 g. of chlorine per hours. The white oil was fed into the reaction cylinder at an even rate over a period of four hours. The temperature was held at 45-55° by means of the air jet. The reaction zone was illuminated by the light from a 60 watt incandescent electric light. The reacted oil discharged into the hydrolysis flask where it was hydrolyzed with 500 g. of 30% sodium hydroxide solution maintained at a temperature of 90-95°. The crude product was then diluted with an equal volume of water and allowed to stand whereupon a layer of unreacted oil separated on top. The aqueous layer was a clear brown solution which was extracted with carbon tetrachloride to remove a residual amount of unreacted oil. After heating to remove traces of solvent the resulting solution exhibited good wetting and detergent properties.

Example II

This example describes the use of another practical apparatus. Into the top of a three foot glass column about three-fourths inch in diameter fitted with a packing consisting of a continuous glass spiral surrounding a glass rod was dropped from a dropping funnel at a regular rate 42 g. of a white oil with a specific gravity of 0.8033 and a boiling range of 264°-308° C. There was passed in at the bottom and out at the top, countercurrentwise, a gaseous mixture of sulphur dioxide and chlorine in the ratio of 3 moles of sulphur dioxide to 1 mole of chlorine. The reaction column was illuminated by the light from a 60 watt electric light bulb suspended near the middle of the column. The reaction liberated heat which was dissipated to the surrounding air. The reaction product was collected in a flask at the bottom of the column and weighed 64 g. This was hydrolyzed by pouring into 48 g. of 30% sodium hydroxide at a temperature of 70-90°. The resultant neutralized solution was diluted with water and alcohol and extracted with petroleum ether. The aqueous solution was heated to drive off the ethyl alcohol and residue of petroleum ether. A clear solution resulted which possessed good wetting and detergent properties.

Example III

Two hundred grams of cetane, obtainable by the dehydration of cetyl alcohol and hydrogenation of the resulting cetene, were reacted with gaseous sulphur dioxide and chlorine in the apparatus as illustrated in the drawing, and by the method as set forth in Example I. The crude hydrolyzed product was a pale yellow opaque liquid. Upon diluting with an equal volume of water a small amount of unreacted oil separated to the top. The lower aqueous layer was removed and was an almost colorless and clear solution. It exhibited superior detergent properties as well as wetting and rewetting properties.

We do not wish to be limited by the examples set forth above nor by the apparatus set forth in the accompanying drawing, as many practical embodiments thereof may be made without departing from the spirit of this invention.

Referring to the drawing, for instance, the oil may be introduced into the reaction cylinder 2 by other means than by gravity, for example, the oil may be contained in a suitable tank or vessel and be delivered to the reaction cylinder by means of a pump of any type and may be measured by means of known equipment so that it is delivered continuously at a given rate. The reaction cylinder 2 is shown in its simplest form as a plain glass cylinder. However, it may take the form of a partly metal, partly glass cylinder with sufficient glass to admit actinic light, or it may be a glass column equipped with plates such as is conventionally used in distillation, or the column may be packed with broken glass or other packing which is translucent. On the other hand, the reaction vessel may be made entirely of metal, such as nickel, and light may be introduced inside it. Quartz may be substituted for glass.

The light source may be ordinary incandescent electric light, or rare gas lamps, or arc-lights which may have special electrodes such as metal or metal-salt cored carbon electrodes.

The gases may be measured by any suitable means such as by means of weight or by means of rotameters. They may be introduced into the reaction zone through a single orifice or a multiplicity of orifices or through orifices containing many small holes such as sintered glass or porous ceramic ware.

The level of the reaction zone may be changed by changing the height at which the discharge line 8 is held. Or a valve may be inserted in the discharge line which may be controlled by an automatic device to keep the liquid in the reaction zone at a predetermined level.

The hydrolysis vessel may be fabricated of a metal not attached by the materials concerned, such as nickel and may be agitated by any of the conventional methods. The temperature may be maintained by use of a jacket around the hydrolysis vessel. Since the hydrolysis and neutralization reactions are quite exothermic, when the reaction is run at a fast rate of speed it is necessary to use cooling water to maintain the temperature at 90-95°. The caustic alkali may be introduced into the vessel by conventional means.

On the other hand, the hydrolysis may be carried out in a continuous method by simultaneously bringing together the stream of reacted oil and a stream of hot caustic solution in a vessel designed to give turbulent flow so that thorough mixing will result. The effluent neutralized mass may then be discharged direct to the purification system or otherwise, as desired. This process may be coupled with the continuous purification methods disclosed in a copending application of Fox, Henke and Reed, entitled "Improved Chemical Process," filed upon an even date herewith, whereby the unreacted oil is removed by means of a continuous centrifuge and the small remaining amount may be removed by continuous extraction. In this manner a completely continuous process may be provided which is quite advantageous when the volume of production is large.

The method is not to be limited in application to the hydrocarbons set forth in the examples, but may be used with liquid or easily liquefiable hydrocarbons or mixtures of hydrocarbons as well as other compounds.

As examples of suitable compounds and materials, mention is made of saturated aliphatic and alicyclic hydrocarbons, including the normal liquid and easily liquefiable n-alkanes, e. g., n-pentane, n-heptane, n-hexane, n-octane, n-nonane, n-decane, n-dodecane, n-tetradecane, n-pentadecane, n-hexadecane, n-octadecane, etc., iso-alkanes, e. g., iso-octane, iso-decane, iso-pentadecane (made by hydrogenating tri-iso-amylene), iso-octane (obtained by hydrogenating di-isobutylene), etc.; mineral oils, particularly refined fractions such as white oil, paraffin wax, etc., naphthenes, e. g., fractions containing an average of 12 carbon atoms per molecule, 15 carbon atoms per molecule, 18 carbon atoms per molecule, etc., decahydronaphthalene, cyclohexane, menthane, camphane, pinane, abietane, dodecylcyclohexane, isopropylmenthane, etc.

Various halogen and other derivatives of the above-mentioned compounds may also be used, e. g., chloro-n-alkanes, chloro-isoalkanes, chloromenthane, chlorodecahydronapthalene, hydroxycamphane, hydroxyabietane, hydroxycamphane, methyl cyclohexanol, N-diethyl cyclohexylamine, cyclohexane monosulphonyl chloride, etc.

The above-described procedural conditions are not only useful in the preparation of derivatives from hydrocarbons, but may be used in almost any reaction between a liquid or liquefiable compound. Thus, it may be used with alcohols, ethers, ketones, carboxylic acids, esters, amides, sulphones, sulphonic acids, etc., which are preferably of high molecular weight, that is, contain at least eight carbon atoms. As specific examples of such compounds, mention is made of dodecyl, tetradecyl, hexadecyl, and octadecyl alcohols, diethyl-heptyl-carbinol, diethyl-tridecanol-6, tridecanone-8, heptadecanone-8, nona-decanone-9, penta-decanone-6, stearic, lauric, myristic, palmitic, decanoic, and erucic acids, methyl stearate, ethyl palmitate, methyl laurate, lard, olive oil, etc.

Mixtures of any of the hereinbefore mentioned classes of compounds or individual compounds may be used.

The rate of flow of gases may be varied according to the rate of flow of the oil and more or less gases per unit of oil may be used than those shown in the examples. The gases are preferably passed through at such a rate that only a small amount of chlorine remains in the vented gases. The ratio of gases may be varied from one mol of sulphur dioxide to one of chlorine to six of sulphur dioxide to one of chlorine, although we prefer to use a ratio of between two and four of sulphur dioxide to one of chlorine and particularly between 2.5 to 3.5 of sulphur dioxide to one of chlorine in many cases.

The temperature may be varied from room temperature up to 110–120° C. or higher but we prefer to operate at temperatures between 30° C. and 70° C. and more particularly between 40° C. and 55° C. as we find these temperatures more efficacious in that the reaction proceeds faster and the final product is lighter in color than if extreme temperatures are used.

We prefer to regulate the flow of oil through the reaction zone so that the discharged reaction mass has reacted to such an extent that it is practically completely soluble after hydrolysis. This point can be determined experimentally and the specific gravity of the reaction mass at this point may be used as an indicator of the extent of the reaction. For example, it was determined for the oil used in Example I that when the specific gravity of the reacting oil had been increased to 1.100 to 50° C. the optimum amount of gases had been passed through and a continuance of the gas flow was of no benefit.

Instead of 30% sodium hydroxide other concentrations from 5% to 50% may be used. The reaction is slower in the lower concentrations and faster in the higher concentrations. We prefer to use a concentration of from about 25% to 40% and more particularly a concentration of about 30%. Other alkalies such as potassium hydroxide may be used. Likewise the alkaline earth oxides and hydroxides may be used. On the other hand, ammonium hydroxide may be used or aqueous solutions of aliphatic, aromatic or heterocyclic amines such as methylamine, diethylamine, pyridine, piperidine, aniline, ethanolamine, triethanolamine, etc., may be used.

On the other hand, the effluent reacted oil which is a sulphonyl chloride may be made to undergo other reactions characteristic of this group such as the formation of amides or substituted amides by reaction with ammonia or amines in the absence of water, or the formation of esters by reaction with alcohols or alcoholates.

As many apparently widely different embodiments of this invention may be made without departing from the spirit and scope hereof, it is to be understood that we do not limit ourselves to the specific embodiments herein except as defined in the appended claims.

We claim:

1. The process which comprises passing an organic compound in a fluid state countercurrent to a gaseous mixture of sulphur dioxide and chlorine.

2. The process which comprises passing an organic compound in a liquid state countercurrent to a gaseous mixture of sulphur dioxide and chlorine.

3. The process which comprises passing a normally liquid organic compound containing a hydrocarbon radical of at least 8 carbon atoms in the liquid state countercurrent to a gaseous mixture of sulphur dioxide and chlorine, while maintaining the main reaction zone under the influence of actinic light.

4. The process which comprises passing a normally liquid organic compound containing a hydrocarbon radical of at least 8 carbon atoms in the liquid state countercurrent to a gaseous mixture of sulphur dioxide and chlorine, while maintaining the main reaction zone under the influence of actinic light at a temperature from 20 to 120° C.

5. The process which comprises passing a normally liquid organic compound containing a hydrocarbon radical of at least 8 carbon atoms in the liquid state countercurrent to a gaseous mixture of sulphur dioxide and chlorine, while maintaining the main reaction zone under the influence of actinic light at a temperature from 20 to 120° C. and hydrolyzing the resulting product.

6. The process which comprises passing a normally liquid organic compound containing a hydrocarbon radical of at least 8 carbon atoms in the liquid state countercurrent to a gaseous mixture of sulphur dioxide and chlorine while maintaining the main reaction zone under the influence of actinic light at a temperature from 20 to 120° C. and continuously hydrolyzing the resulting product.

7. The process which comprises passing a saturated hydrocarbon in the liquid state countercurrent to a gaseous mixture of sulphur dioxide and chlorine under the influence of actinic light, continuously drawing off the liquid reaction products and hydrolyzing the same.

8. The process which comprises passing a saturated aliphatic hydrocarbon in a liquid state downwardly into countercurrent relationship with an ascending gaseous mixture of sulphur dioxide and chlorine while maintaining intimate contact between the reagents and under the influence of actinic light.

9. The process which comprises passing a saturated aliphatic hydrocarbon in a liquid state downwardly into countercurrent relationship with an ascending gaseous mixture of sulphur dioxide and chlorine while maintaining intimate contact between the reagents and under the influence of actinic light, and hydrolyzing the liquid product with a basic solution.

10. The process which comprises passing a saturated aliphatic hydrocarbon in a liquid state downwardly into countercurrent relationship with an ascending gaseous mixture of sulphur dioxide and chlorine while maintaining intimate contact between the reagents and under the influence of actinic light, and hydrolyzing the liquid reaction product with a solution of a strong inorganic base.

11. The process which comprises passing a refined mineral oil fraction containing an average of at least 12 carbon atoms, in the liquid phase countercurrent to a gaseous mixture of sulphur dioxide and chlorine, while maintaining the reaction zone under the influence of actinic light.

12. The process which comprises passing cetane in the liquid phase countercurrent to a gaseous mixture of sulphur dioxide and chlorine, while maintaining the reaction zone under the influence of actinic light.

13. The process which comprises passing a saturated hydrocarbon in the liquid state countercurrent to a gaseous mixture of sulphur dioxide and chlorine under the influence of actinic light, continuously drawing off the liquid reaction products and hydrolyzing the same, with a solution of sodium hydroxide of 5 to 50% strength.

14. The process which comprises passing a paraffin wax in the liquid phase countercurrent to a gaseous mixture of sulphur dioxide and chlorine, while maintaining the reaction zone under the influence of actinic light.

WILLIAM H. LOCKWOOD.
JOSEPH L. RICHMOND.